July 25, 1967  C. C. SPERRY ETAL  3,332,367
APPARATUS FOR MAKING TABLETS
Filed July 15, 1965  6 Sheets-Sheet 1

INVENTORS
CHESTER C. SPERRY
HARRY S. DANKERT
BY
Robert E. Woodhams
ATTORNEY

INVENTORS
CHESTER C. SPERRY
HARRY S. DANKERT
BY
Robert E. Wodhams
ATTORNEY

INVENTORS
CHESTER C. SPERRY
HARRY S. DANKERT
BY
Robert C. Wadhams
ATTORNEY

United States Patent Office 3,332,367
Patented July 25, 1967

3,332,367
APPARATUS FOR MAKING TABLETS
Chester C. Sperry and Harry S. Dankert, Kalamazoo, Mich., assignors to The Upjohn Company, Kalamazoo, Mich., a corporation of Delaware
Filed July 15, 1965, Ser. No. 472,292
11 Claims. (Cl. 107—17)

This application is a continuation-in-part of Ser. No. 307,114, filed Sept. 6, 1963, and now abandoned, and assigned to the same assignee as the present application. The invention relates to a tablet making machine and particularly to a machine adapted for the making of very small tablets, such as tablets of the order of 0.030 to 0.080 inch diameter.

Tableting machines for forming tablets by compressing a suitably prepared powder between a pair of opposed pressure members, such as cam operated punches, have been known for many years and have been used under a wide variety of circumstances. However, as previously known, the principles of these machines have not normally been applicable to embodiments having more than three or four punches operating simultaneously nor have they been applicable to the making of tablets of much, if any, under about ⅛-inch in diameter. However, according to prior usage of many years, when smaller pellets have been desired, they have been made by other processes which, insofar as we are aware, have been either of only minimal accuracy or have been more expensive to carry out.

Inasmuch as the present invention was developed in, and is particularly intended for use in, the pharmaceutical industry, the following discussion will proceed in terms of such industry. However, it will be recognized that the need for the formation of small pellets is not confined to the pharmaceutical industry and hence, excepting as otherwise hereinafter expressly limited, the invention will be recognized as being of wider applicability than in the single industry just mentioned.

Turning now to the requirements of the pharmaceutical industry for the formation of small pellets as above mentioned, one particular area of such use is in the provision of medicaments for use in hard capsules, it often being preferred to use such medicaments in the form of pressed pellets instead of loose powder for the purposes of a better appearance in the finished product, more accurate control of the amount of medicaments supplied to each capsule and easier handling by automatic equipment. In the past, according to prior practice, extending over a period of many years, these pellets have been made by forming a coating of medicament around a small kernel, such as a sugar crystal, and building same up to an average approximate desired size. However, inasmuch as the size involved was of the order of ¹⁄₆₄–¹⁄₃₂-inch diameter, it is apparent that a very small variation in the actual size would lead to a very large percentage variation in the weight of the pellets, often as much as 15 percent. This has made necessary the use of certain inconvenient procedures for controlling the amount of fill for a given capsule as well as some lack of uniformity in the dissolving and resulting absorption of the medicament into the human body. Other methods for forming pellets, such as the chopping of extruded filaments, as commonly used in the plastics industry, have been considered in connection with the problem as above outlined for pharmaceutical uses but have been rejected as impractical and particularly not appropriate to the handling of a material which normally is a powder.

In contrast to the relative inaccuracies in the procedures above mentioned, in one use currently being made of an embodiment of the present invention, pellets are being made of a diameter of 0.040 inch with their weights being held within a tolerance of plus or minus 5 percent.

This accuracy requirement will be recognized as being especially critical when one realizes that in conventional compression forming of tablets, the punches used for a tablet of ³⁄₁₆-inch diameter normally have the clearance with respect to the openings in which they operate of 0.001–0.002 inch over the entire diameter of said opening. With such clearances permissible, and with only a single punch operating at a given time, it is entirely within the scope of practicality, and it has for many years been common practice, to permit the punch to be completely withdrawn from the cavity in which a tablet is formed after each operation for the ejection of a finished tablet therefrom and for the insertion thereinto of the powders from which the next tablet is to be made. However, where the tablets are to be of only 0.040 inch diameter it will be apparent that in a multiple punch operation, if such punches are withdrawn completely from the opening, there will be present a very severe problem of alignment in order that the punches can re-enter the cavities after the appropriate amounts of powder have been supplied thereto. Further, such very small punches usually are for obvious reasons required to have even closer tolerances with respect to the openings in which they operate and this makes the alignment and operational problems still more severe. Where in order to obtain a production of reasonable volume (bearing in mind that 50 or more of such pellets may go into a single capsule and that such capsules are produced at the rate of several hundred per hour) such pellets are made in multiples of 50 or more, the problem of aligning such a large number of punches for simultaneous operation becomes virtually impossible.

Therefore, the objects of the invention include:

(1) To provide an improved method, and apparatus for practicing same, for forming very small pellets, namely, pellets of the order of 0.030–0.080 inch diameter, by compression of a powder.

(2) To provide a method and apparatus, as aforesaid, for forming very small pellets of highly uniform density.

(3) To provide a method and apparatus, as aforesaid, for forming very small pellets of highly uniform size.

(4) To provide a method and apparatus, as aforesaid, for forming very small pellets wherein said pellets may be made in multiples, such as 50 to 100 thereof, at each operation of the machine.

(5) To provide a method and apparatus, as aforesaid, which will eliminate the problem of withdrawing compression punches from the cavities in which the pellets are formed and holding same in alignment for re-entry into such cavities.

(6) To provide an apparatus, as aforesaid, having only one set of punches movable within the cavities in which said pellets are formed and enabling these punches to remain at all times within said cavities.

(7) To provide a method and apparatus, as aforesaid, in which the pellets are formed within a cavity between a compression member closing one end of said cavity and a punch reciprocable within said cavity.

(8) To provide an apparatus, as aforesaid, which will operate in a manner sufficiently similar to that of previous tableting machines, wherein relatively large oppositely moving punches are used to form relatively large tablets as above described, so that it can be operated by personnel who are acquainted with such previously known tableting machines.

(9) To provide a tableting apparatus, as aforesaid, whose maintenance in good operating condition will be no more difficult than with presently known machines for making larger tablets and in which, when repairs or adjustments are required, same can be made in the same general manner as with previously known tableting machines and with a minimum of difficulty.

(10) To provide an apparatus, as aforesaid, which is capable of manufacture for performance at a high level of operational accuracy, but which machine will not be appreciably more expensive than presently known conventional tableting machines for the making of larger tablets.

Other objects and purposes of the invention will be apparent to persons acquainted with methods and apparatus of this general type upon reading the following specification and inspection of the accompanying drawings.

GENERAL DESCRIPTION

In general, the invention contemplates the elimination of the upper one of the opposed punches which according to previous practice operated within a cylindrical cavity and which was withdrawn therefrom during both the filling of said cavity with powder and the ejection therefrom of a finished tablet, and replacement of said upper punch by an upper wall for closing the upper end of an otherwise conventional cavity whereby the lower punch will compact suitable raw material against said upper wall after which said upper wall can be withdrawn and the pellets ejected. Such procedure requires certain controls specific to this type of apparatus, such as means for the prevention of build-up of stray powder between the upper surface of the table containing the cavity and said upper wall, and such as making sure that the said upper wall is firmly seated to close the cavity before pressure is applied to the upwardly moving punch and maintaining such firm seating of said upper wall until the compression is completed.

The apparatus aspects of the invention include providing a rotary table generally similar to rotary tables presently known in tableting machines and provided with circumferentially spaced tablet forming cavities. Where the machine is arranged for producing multiple tablets at each operating station, there will be provided a cluster of such cavities at each station. Lower compression members or punches are provided for reciprocation within said cavities and cam means provided below such punches for operating same. Upper compression members are provided one for each station and each having a bottom wall capable of covering the entirety of the cluster of cavities at each station. Both the upper surface of said table and the bottom walls of each upper compression member are ground so that they are parallel with each other within very close tolerances in order that when the upper compression member is in place against the upper surface of the table, each cavity of a given cluster will be tightly closed. Suitable cam or other means are provided for actuating said upper compression members as required.

DETAILED DESCRIPTION

Inasmuch as the method of the invention can be best understood by a consideration of same as carried out in a given apparatus, the following description will be directed primarily toward one preferred embodiment of the apparatus of the invention. While it is believed that some aspects of the invention lie in the apparatus and the hereinafter appended claims therefore are directed toward such apparatus, other aspects of the invention lie in the method steps by which the tablets are formed and such method steps can be carried out by other apparatus. Further, it will be understood that the method and apparatus as hereinafter described are described in connection with making tablets in the pharmaceutical industry for purposes of illustration but it will be understood that the same are widely applicable to other environments and the invention will be interpreted accordingly.

In referring to the drawings certain terminology will be used for convenience and such is not of limiting significance. For example, the terms "upper" and "lower" will refer to portions of the machine in a normal position of use. The directions "inwardly" and "outwardly" will refer to the directions toward and away from the geometric center of the machine. The terms "rightwardly" and "leftwardly" will refer to such directions in the particular figures of the drawings in connection with which such terminology is used. All of the above-mentioned terminology will include derivatives of the words above mentioned as well as words of similar import.

Turning now to the drawings wherein there is illustrated a specific embodiment of the apparatus of the present invention, there is provided a tableting machine which in many respects is identical with standard tableting machines and which may be, for example, of the form illustrated in connection with certain test equipment therefor in the application of Ross, Sperry and Knoechel, Ser. No. 243,338, filed Dec. 10, 1962, now Patent No. 3,255,716, under the title of Measurement of Forces Within a Tableting Machine and assigned to the same assignee as the present application. Said standard machine will be modified as further described hereinafter.

Figure 1:
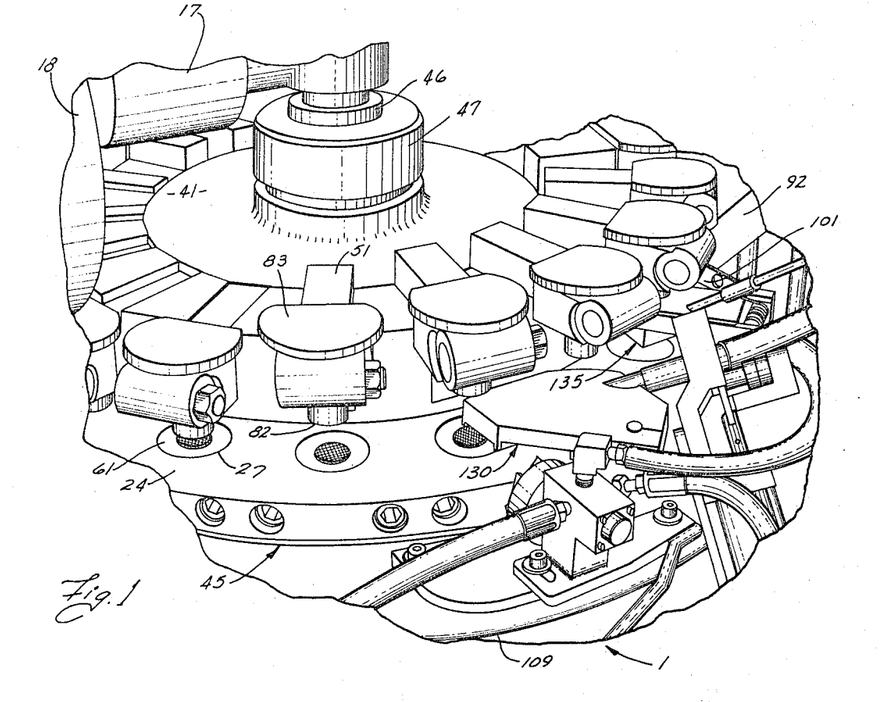
FIGURE 1 is an oblique fragmentary view of a portion of a tableting machine embodying the invention.

Referring now to the drawings there is provided a suitable central frame 1 (FIGURES 1 and 3) supporting a plate 2, the same being fastened to said central frame by any convenient means such as screws of which one is indicated at 3. To said plate 2 there is affixed a spindle 4 in any convenient manner such as by a shoulder 6, a stud 7 and a nut 8. Said spindle 4 also is provided with portions 11 and 12 of reduced diameter for the support of bearings 13 and 14, respectively, whose purpose will appear hereinafter. The upper end of said spindle has a portion 16 of further reduced diameter which in a conventional manner rigidly supports an arm 17 upon which is freely rotatably mounted a compression wheel 18. A nut 19 holds the arm 17 firmly in place on the spindle 4. The arm 17 is supported at its other end by an upstanding bracket 20 which is secured at its lower end to the frame 1.

Figure 3:
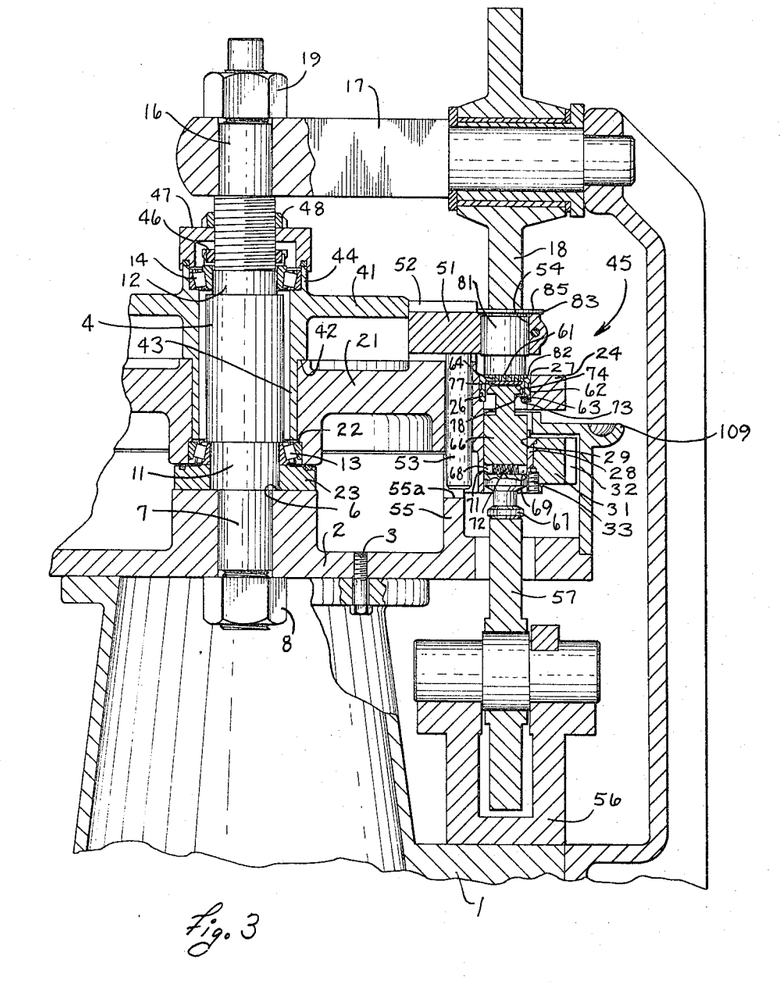
FIGURE 3 is a sectional view taken on the line III—III of FIGURE 2.

The lower punch holder and the cavity insert holder are provided on a lower annular member 21 which encircles the spindle 4. Said annular member 21 is supported by its shoulder 22 on the outer race of the bearing 13, the inner race of said bearing being supported on a ring 23 which in turn is supported on and by the plate 2. Said annular member 21 has an upper radial projection 24 into which are bored circumferentially spaced openings 26 for receiving the cavity inserts 27 hereinafter described in more detail.

Spaced below the projection 24 is a lower radial projection 28 into which are bored punch driver openings 29 coaxially aligned with the openings 26 for receiving the punch drivers described hereinafter in more detail. Outwardly of the projection 28 is arranged the drive ring 31 having toothed elements 32 thereon for rotatively driving the annular member 21 in any convenient manner, such as by a gear (not shown). Said drive ring 31 is in this embodiment held in place by the set screw 33 whereby said ring is readily replaceable, either for maintenance purposes or for providing different drive ratios as desired.

The upper compression member holding table comprises an upper annular member 41 provided with a shoulder 42 and a downwardly extending sleeve 43 by which same is centered within and supported on the lower annular member 21. Said upper member 41 also has an upwardly projecting sleeve 44 which encircles the bearing 14 for holding firmly both the upper and lower annular members coaxial with the spindle 4. The upper bearing 14 is held in place by a suitable nut 46 and the bearing chamber is closed by a cap 47 held in place by a nut 48.

The upper annular member 41 has a plurality of radial blocks 51 vertically slideably received within suitable circumferentially spaced radial recesses 52 for positioning and alignment of same. Each of the blocks 51 is supported on a vertical post 53 which passes through an opening in the member 21 and is slidingly supported on the cam surface 55A of the flange 55 of the plate 2. Each of said blocks 51 is provided with a bore 54 for receiving therein one of the upper compression members 81 as hereinafter further described.

In this manner the upper member 41 and lower member 21 rotate together and comprise a table 45 and are firmly held by the bearings 13 and 14.

A pedestal 56 extends upwardly from the central frame 1 and supports a lower compression wheel 57 for free rotation in a conventional manner and for purposes appearing further hereinafter.

Figure 4:
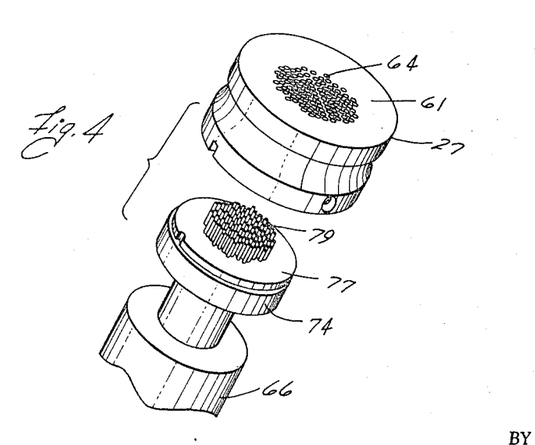
FIGURE 4 is an exploded view of a lower punch and cavity insert for the machine shown in FIGURE 1.

Turning now to the powder receiving and compressing means, the cavity inserts 27 (FIGURES 3 and 4) above mentioned comprise in this embodiment a plurality of inverted cup-shaped platens 61, each of which has a depending skirt 62 which in turn is supported upon a shoulder 63 within the bore 26. Said platen 61 is provided with a plurality of drilled openings therethrough, one thereof being indicated at 64, which constitute both the guides for the lower punch and the tablet-forming cavities. A punch driver 66 is snugly but vertically slideably received into each of the bores 29 and has a projecting contact member 67 at the lower end thereof adapted for engaging the compression wheel 57 or other cam mechanism suitably arranged below the lower member 21. A pair of friction members 68 and 69 are received in a cross bore 71 in the driver 66 and are urged outwardly away from each other by resilient means 72 in order to hold the punch driver 66 in any given position when same is not actually being operated on by the compression wheel 57 or by a cam. The upper end of the punch driver 66 is narrowed both for convenience and to provide space for the entry of a screw 73 by which downward movement of said driver with respect to the platen 61 is positively limited, the same being desired when the punch driver 66 and platen portion 61 are removed from the lower member 21 for repair and/or replacement thereof. It will be understood that the screw 73 is positioned appreciably below the lowermost position of the punch driver head 74 in normal operation of the machine so that it does not interfere with the movement thereof. A punch plate 77 rests on the upper end of the head 74 and is preferably rigidly affixed thereto by any convenient means, such as screws, of which one is indicated at 78. Said punch plate 77 supports a plurality of punches 79 which are rigidly affixed thereto and extend upwardly therefrom into the cavities 64.

An upper compression member 81 is received within each of the openings 54 and is clamped in fixed position in the block 51. Each of them has a smooth planar lower surface 82 and a flange 83 at its upper end, said flange having a smooth planar upper surface. Said flange 83 provides a contact means for receiving pressure from the upper compression wheel 18.

The upper surface 85 of flange 83, the lower surface 82 of the compression member 81 and the upper surface of the platen portion 61 of the insert 27 are ground flat within very narrow tolerances and the means holding same are carefully machined such that said surfaces are parallel to each other also within very narrow tolerances. This is done so that when said lower surface 82 lies against the upper surface of the platen 61, all of the openings 64 within said platen 61 will be tightly closed.

Turning now to the means by which powder for compression into tablets is supplied to the upper ends of the cavities 64, it should be emphasized that it is extremely important in a machine for meeting the objectives of the present invention that such powder be very accurately controlled, both to insure that each cavity in a given cluster is completely filled and so that there is no appreciable amount of excess powder lying on the surface of either the platen 61 or the lower surface of the upper compression member 81 because if powder does exist in either of these places when said surfaces are urged together, the shape of the platen 61 will be changed or possibly the platen 61 will be broken and thereby to destroy the accuracy which it is the intention of this invention to maintain. Therefore, while powder feeding, scraping and brushing means have in a broad sense been previously known, such means in the present invention are subjected to certain precise requirements not present in previous machines and accordingly are constructed with these requirements in mind.

Figure 6:
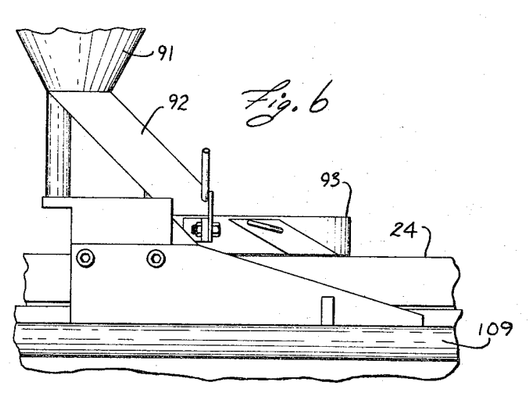
FIGURE 6 is a fragmentary elevational view of the feeding apparatus substantially as taken on the line VI—VI of FIGURE 2.
Figure 7:
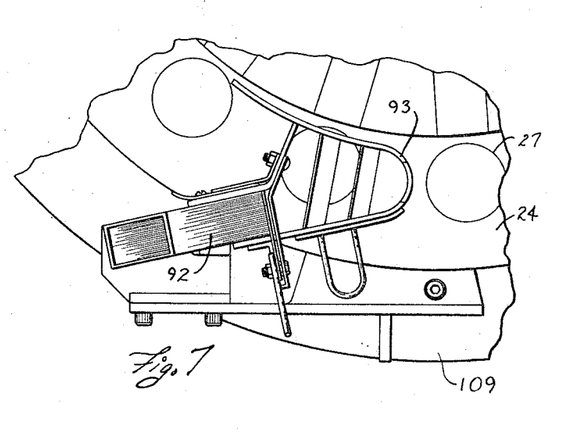
FIGURE 7 is a top plan view of the apparatus of FIGURE 6.
Figure 8:
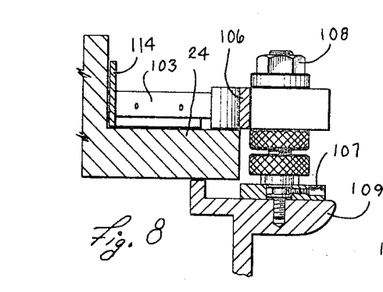
FIGURE 8 is a sectional view taken on the line VIII—VIII of FIGURE 2.

For feeding the powder there is provided a hopper 91 (FIGURES 2, 6 and 7) having a chute 92 extending downwardly therefrom and feeding into a distribution box 93 which overlies the portion 24. Means of any convenient sort are provided within the distribution box 93 for controlling the amount of powder deposited on the platens 61 at any given time. Since, as hereinafter described in more detail, the punches 79 are being retracted at the time the individual platens and stations represented thereby pass under the feed means, material will enter into the openings 64. Any material remaining on top of said platens must be scraped off because the upper surface of the platen must be clean for the reasons discussed above.

Figure 9:
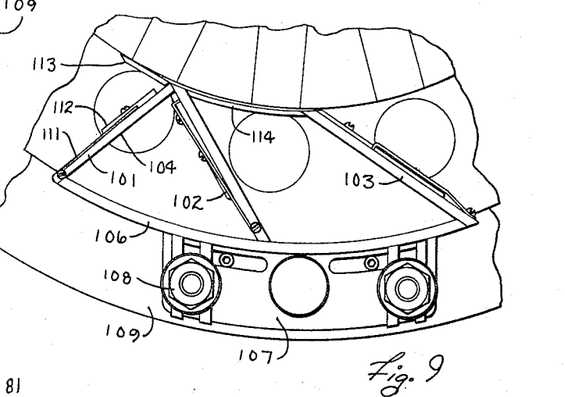
FIGURE 9 is a fragmentary top plan view of the powder-smoothing means positioned between the supply means and the tablet forming means.

To assist in filling the openings 64 and to provide such scraping, there is provided a plurality of scrapers (FIGURES 2 and 9) closely adjacent the feeding means, said scrapers being indicated at 101, 102 and 103, respectively. Said scrapers are substantially identical and hence a description of the scraper 101 will be sufficient to describe all three. The scraper 101 comprises a plate 104 which is fixed to a mounting bracket 106 which latter is mounted through a further bracket 107 and screws 108 onto the fixed rim 109. Said bracket 104 supports a resilient arm 111 upon which is mounted the actual scraping unit 112 positioned for bearing against the upper surface of the upper projection 24. By placing the several scrapers at different angles with respect to the direction of travel of said platens, a more efficient and complete filling and scraping operation is accomplished so that the cavities are completely filled and the upper surface of the platen is clean.

The excess material scraped off the platen 61 is moved to the radially outer edge of the revolving projection 24 and travels therewith and is returned to the distribution box. Inner guard means 113 and 114 are provided on the scraping means for inhibiting the movement of powder radially inwardly with respect to the several platens.

Figures 10, 11:
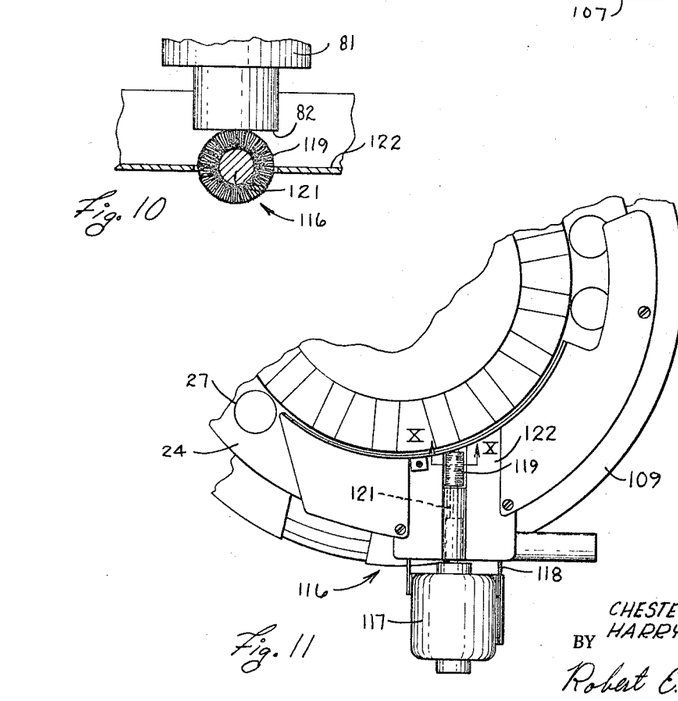
FIGURE 10 is a sectional view taken on the line X—X of FIGURE 11.
FIGURE 11 is a fragmentary top plan view showing cleaning means for the upper punch.

As above noted it is equally important that the lower end of the upper compression member also be kept clean of accumulated powder. Hence, brush means 116 (FIGURES 2, 10 and 11) are provided for this purpose. A convenient type thereof comprises a continuously running motor 117 suitably mounted through a bracket 118 onto the mounting rim 109. A rotary brush 119 is mounted on a shaft 121 which is connected to and rotated by the motor 117, said brush being positioned as shown in FIGURE 10 for contacting the lower end 82 of the upper compression member 81 as such member travels past same. Preferably a guard structure 122 may also be provided substantially closing the area around said brush to prevent powder on the brush, brush bristles, etc. from falling back onto the platens 61.

Figure 12:
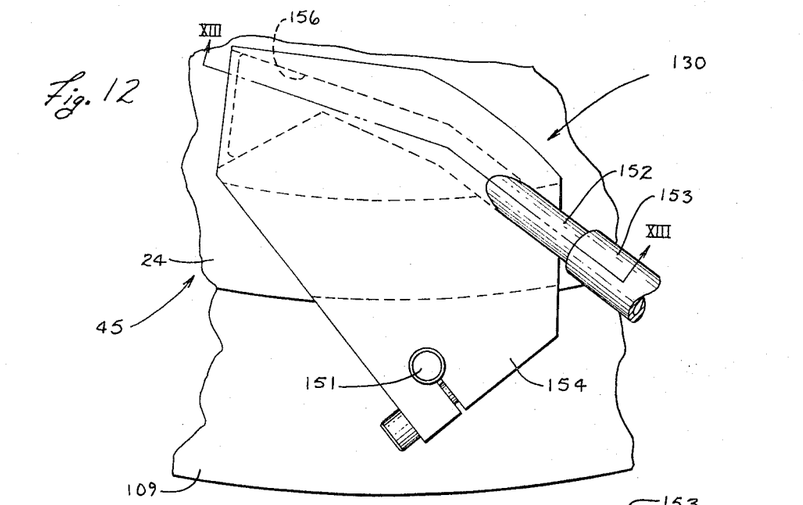
FIGURE 12 is a top plan view of the means utilized for withdrawing finished tablets from the table.
Figure 13:
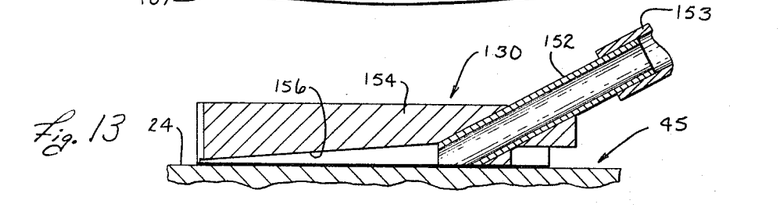
FIGURE 13 is a sectional view taken on the line XIII—XIII of FIGURE 12.

There is provided vacuum means 130 (FIGURES 2, 12 and 13) for effecting removal of the formed pellets from the machine, said vacuum means being provided at a point immediately following the formation and ejection of the pellets. In the particular embodiment here provided, a support structure 151 extends upwardly from the mounting rim 109 and supports a suction shoe 154 which in turn supports a hollow arm 152 and a tube 153. The said shoe 154 has an internal cavity 156 which is arranged across the path followed by the punches 79 in their circumferential movement with the rotating table 45. A suitable source of suction is applied to the hollow arm 152 through the tube 153 for effecting the withdrawal of the tablets after the ejection thereof from the openings 64.

Figure 2:
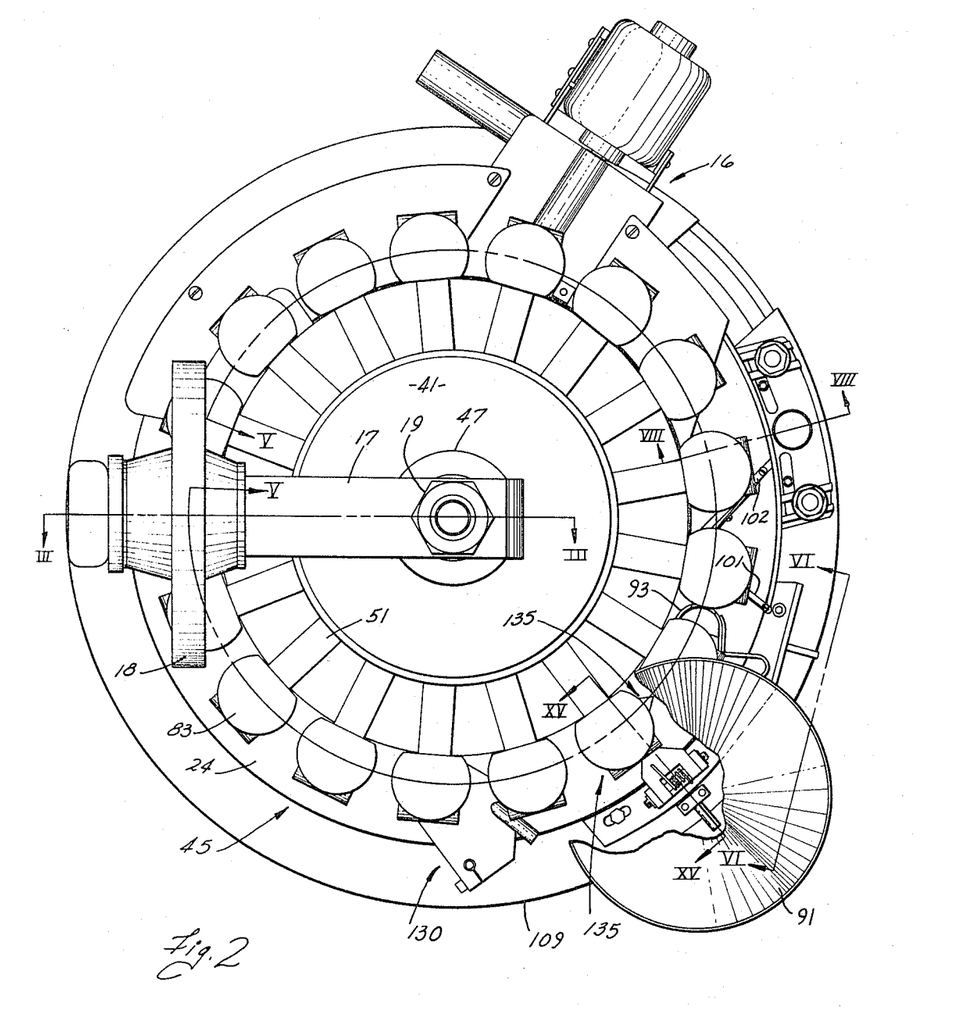
FIGURE 2 is a top plan view, partially broken away, of a tableting machine embodying the invention.
Figure 14:
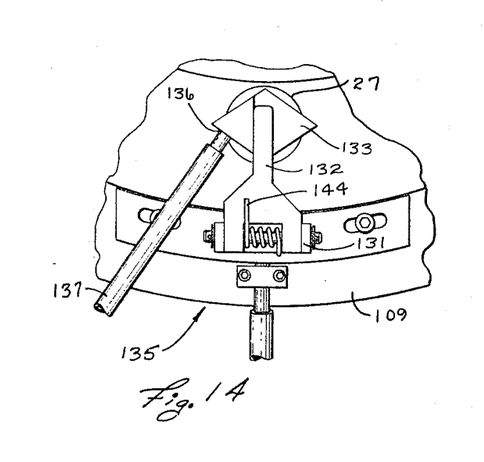
FIGURE 14 is a fragmentary top plan view of the means for cleaning the cavities.
Figure 15:
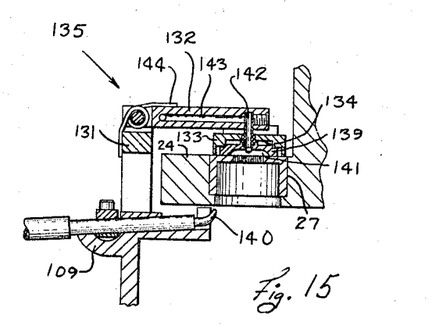
FIGURE 15 is a sectional view taken on the line XV—XV of FIGURE 2.

Further, for best operation, and in spite of the projection of the upper ends of punches 79 entirely out of the tablet forming cavities 64 during the ejecting operation, it is desirable to provide cleaning means for the cavities, such as that indicated at 135 (FIGURES 2, 14 and 15). In the particular embodiment here illustrated, the cleaning means 135 includes a pedestal 131 extending upwardly from the mounting rim 109 and said pedestal pivotally supports an arm 132. Said arm is connected to and supports a hollow shoe 133 which bears against the upper projection 24 and particularly the portion thereof occupied by the several platens. Said shoe 133 is of elongated, here diamond, shape and is provided with an internal cavity 134. A cross bar 139 is provided with a narrow slot 141 therein and same is located intermediate the ends of the shoe 133. Said slot 141 is connected by the passageways 142 and 143 to a source of compressed air which, flowing out at a high velocity through the slot 141 will loosen any powdered material which may have become packed under platen 61 or on top of plate 77. A withdrawal nozzle 136 communicates with the cavity 134 and same is connected to a suitable vacuum line 137 by which material within said cavity 134 which has been loosened by said compressed air may be withdrawn.

Resilient means, such as a conventional spring 144, are preferably provided for holding the shoe 133 snugly against the upper projection 24 and the platens 61.

The nozzle 140 is connected to a source of compressed air which is periodically turned on to loosen materials which may collect under the platens 61 or on top of the plates 77.

Figure 5:
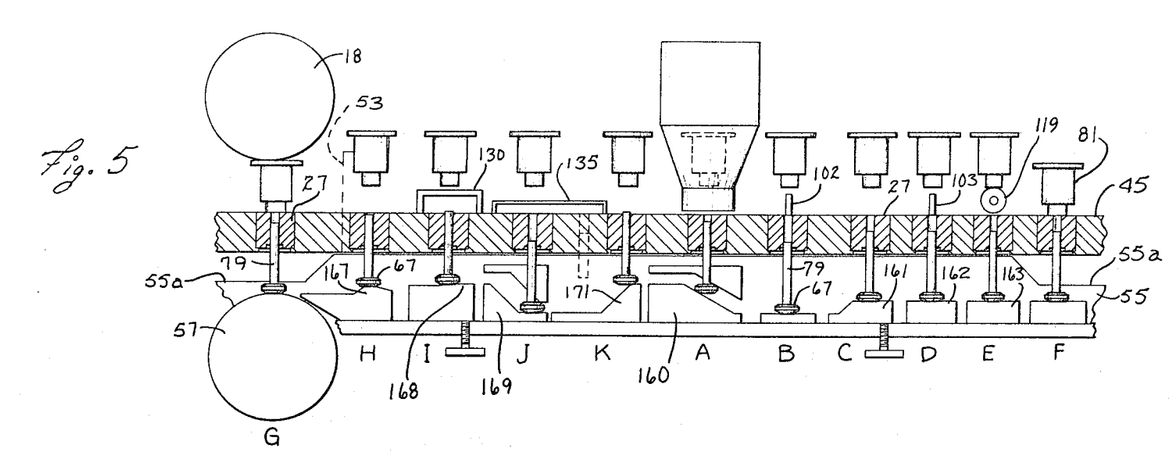
FIGURE 5 is a somewhat schematic sectional view in unwrapped form taken on the line V—V of FIGURE 2.

Suitable cams are provided for engagement by the contact members 67 of the several punch drivers 66, as illustrated in FIGURE 5. The cams are schematically illustrated in FIGURE 5. In order to simplify the drawings, in FIGURE 5 there is shown a single punch 79 associated with a contact member 67 at each station. It will be understood that actually each contact member 67 and associated punch driver 66 cooperate with a large number of punches 79 at each station. In this particular embodiment, a channel-shaped cam 160 is positioned below the powder feeder for engaging the upper surfaces of said punch driver heads 67 for pulling same downwardly to open said cavities for filling with powder as they pass under powder feeder. Immediately thereafter a second cam 161 engages the lower side of said punch driver head 67 for moving said punches upwardly to the position required for striking off excess powder. The cam then terminates and said punch drivers are held in position by the friction members 68 and 69 above described until they reach the region of the final compression. At this point the flanges 83 of the upper compression members 81 are successively engaged by the upper compression wheel 18 and held snugly and firmly against the upper surface of their associated platens 61. The upper compression wheel 18 is positioned to effect this operation before any upward movement takes place on the part of the punch drivers 66. As soon as said upper compression member is firmly in place, the punch driver heads 67 then engage the lower compression wheel 57 by which said punch drivers and consequently said punches 79 are urged upwardly for simultaneously compressing the powder in all of the cavities 64 within a single platen firmly against the lower surface of the upper compression member 81. This effects a satisfactory and accurate compression of said powders to form the desired pellets. The upper compression members 81 are now permitted to be moved back upwardly and the punches 79 are caused by further cams 167 and 168 to move upwardly for ejecting said pellets from the openings 64. Said pellets are now removed by the vacuum means 130 from the upper surface of the projection 24 and the platens 61 into suitable collecting means, not shown.

OPERATION

Although the operation has been somewhat indicated in the foregoing description of the apparatus, same will be reviewed fully to insure a complete understanding of the invention.

Inasmuch as the operations of all of the stations are identical, a description of a full cycle with respect to a single station will be sufficient to describe the operation of all of said stations. Commencing with powdered material in the hopper 91 (station A in FIGURE 5) same is discharged continuously onto the upper surface of the rotating table. The punches 79 are lowered by the cam 160 as same pass under the hopper. The scrapers 101 and 102 then assist in filling the cavities (station B in FIGURE 5). Immediately thereafter, as shown at station C in FIGURE 5, the cam 161 lifts the lower punch operator 67 and the punches 79 associated therewith which raises the punches to such a point that they will expel excess powder from the respective cavities so that the powder remaining therein will be of the right amount from which to form a pellet of the desired size. Such excess powder is removed from the platen 61 by the scraper 103 and is moved toward the radially outer edge of the projection 24 as described above. The punches 79 may now be maintained at this same elevation, either by the friction devices 68 and 69 shown in FIGURE 3 or, if preferred, they may be maintained in such position by suitable cams 162 and 163. Ordinarily, however, the use of such cams by themselves is not entirely satisfactory inasmuch as it is very difficult to maintain same in a straight line with the precision required for the machine of the present invention.

At station E, the upper compression member 81 passes over the brush 119 for cleaning the lower end of the upper compression member as above described. At station F, the block 51 carrying the upper compression member is permitted by the cam surface 55A to descend until the lower surface of the compression member contacts the upper surface 61 of the cavity insert 27. In this condition, the upper and lower punches now go between the punch rollers 57 and 18, each of which is mounted for free rotation.

By reference to FIGURE 5 (station G) it will be apparent that the compression wheel 18 is circumferentially offset slightly ahead of the lower compression wheel 57 in order that it will contact the flange 83 of the upper compression member in order to make sure that same is seated firmly against the cavity insert 27 before upward pressure is imposed by the lower compression wheel 57 against the punches 79. Of course, the upper end of the upper compression member is made wide enough that pressure will be held thereon by the upper compression wheel 18 for the full compression period which terminates only when the lower punches 79 start moving off the high point of the wheel 57.

At station H the punch head 67 of the lower punches is engaged by the cam rise 167 by which the punches 79 are raised and the pellets formed immediately thereabove are at least partially expelled. It may be noted that the ejection station is immediately adjacent the compression station so that the ejection force is effective to urge the projection 24 upwardly. Since the wheel 18 and compression member 81 hold the projection 24 against upward movement, vertical deflection of the projection 24 at the tablet forming station is prevented. The punches 79 are raised somewhat farther by cam 168 at station I, the pellets are caused to pass under the vacuum pickup device 130 which pneumatically removes the pellets from the region of the insert 27 in which a given group has been formed and delivers them to any suitable receiving means, not shown.

At station J the punches are again retracted by the cam 169 whereupon the given station passes under the cleaning means 135 for removal of any powder remaining thereon as above described.

At station K immediately following cleaning means 135, the cam 171 preferably once more lifts the punches 79 sufficiently to cause same to project substantially flush with the upper surface of the insert 27. When the punches 79 are retracted as they pass under the filling station, such retracting movement assists in filling the cavities wtih the powder.

By the apparatus herein described, is is readily possible to have 100 tablet-forming cavities in each of the insert 27 and the several objectives of the invention above set forth are effectively accomplished.

Although a particular preferred embodiment of the invention has been disclosed for purposes of illustration, it will be understood that variations or modifications thereof which lie within the scope of the appended claims are fully contemplated.

The embodiments of the invention in which an exclusive property or privilege is claimed are defined as follows:

1. In a tableting machine for making small tablets, the combination comprising:
   a table having a group of openings therethrough and means for moving said table between a filling station and a compression station, said group of openings comprising a multitude of openings whose width is not substantially in excess of .080 inch;
   a movable upper compression member engageable with the upper surface of said table for simultaneously closing the upper ends of all of said openings of said group;
   means for holding said upper compression member away from said table when same is in the region of said filling station and means for urging said upper compression member downwardly and tightly against said table when same is in the region of said compression station;
   a single punch driver for said group of openings and means mounting same for movement with said table;
   a plurality of punches each entering into one of said table openings from below and means by which movement of said punch driver effects simultaneous movement of said plurality of punches;
   lower means for effecting retraction of said punches at said filling station and urging said punches upwardly toward said upper compression member in the region of said compression station;
   said holding means raising the upper compression member on completion of compression of the tablets by the punches;
   whereby said openings may be filled with powder in said filling station and compressed into pellets of predetermined size and density in said compression station.

2. The machine defined in claim 1, in which said table is rotatable and has a plurality of circumferentially spaced groups of openings, each group of openings having an upper compression member, a punch driver and punches movable therewith, and including a plate on the upper end of said upper compression members and an upper compression wheel at said compression station arranged to bear on said plates in succession for holding said upper compression members against said table as same successively pass under said wheel to provide a force holding said upper compression members against movement away from said table, said plates extending a greater distance in a circumferential direction than their associated upper compression members.

3. In a tablet compressing machine the combination comprising:
   a frame;
   a die mounted on said frame and held against vertical movement with respect thereto, said die having a plurality of parallel upright openings therethrough, said die having wall means defining a central recess in the lower side of said die, said central recess being in communication with said openings;
   a single, vertically movable punch plate having a downwardly projecting stem and having a plurality of upwardly projecting punches, said punch plate being slideably received within said recess, each punch being closely slideably receivable into the bottom of one of said openings whereby when said punch plate is raised said punches simultaneously move upwardly within said openings;
   a vertically movable upper compression member having a lower surface of greater area than the area of the upper surface of the die occupied by said openings, said lower surface of said upper compression member being tightly engageable with said upper surface of said die for simultaneously closing off the upper ends of said openings;
   independent means mounted on said frame and respectively engageable with said upper compression member and said stem for simultaneously pressing said compression member downwardly and said stem upwardly.

4. A pellet forming machine, comprising:
   a stationary frame;
   a horizontal table rotatably mounted on said frame, said table having an annular projection on its periphery, the projection having a series of circumferentially spaced openings therethrough;
   a platen member mounted within each of said openings, each of said platen members having a flat upper surface and having a multitude of closely spaced vertical cavities extending therethrough;
   an upper compression member mounted on said frame above and in vertical alignment with each of said openings, each of said upper compression members having a flat lower surface adapted to seat tightly against the upper surface of its associated platen member, said lower surface being of greater area than the area of said platen occupied by said cavities so that said upper compression member simultaneously closes the upper ends of all of the cavities of its associated platen member when said upper and lower surfaces are in engagement;
   a vertically slideable punch plate associated with each platen member and disposed therebelow, said punch plate being mounted in said projection for rotation therewith, each punch plate having a multitude of punches extending vertically therefrom, each punch being vertically slideably received in one of said cavities and forming a movable bottom wall thereof, each punch plate having a central stem projecting downwardly therefrom;

means mounted on said frame for moving said upper compression member and said punch plates vertically toward and away from each other, as said table rotates, said means including a pair of substantially vertically aligned rollers respectively engageable with the upper end of said upper compression member and the stem for simultaneously urging same toward each other at a pellet forming station;

a vacuum head mounted on said frame at an ejection station following said pellet forming station and slideably engageable with the upper surface of said platens and means for moving said punches upwardly adjacent said vacuum head for ejecting the pellets from the cavities so that the pellets can be picked up by said vacuum head;

a cleaning head at a cavity cleaning station following said ejection station engageable with said upper surface of said platens for directing compressed air into said cavities and removing any powder therefrom and vacuum means in said cleaning head for withdrawing powder from said machine;

a hopper and means for feeding powder therefrom onto the upper surface of said projection at a filling position following said cavity cleaning station;

scrapers slideably engaging said upper surface of said projection for engaging the powder and directing it into said cavities and removing excess powder from said upper surface; and a brush for engaging the lower surfaces of said upper compression members for removing powder therefrom.

5. The machine defined in claim 1, in which said table is rotatable and has a plurality of circumferentially spaced groups of openings therein, and upper compression member associated with each group of openings and means mounting said upper compression members for rotation with said table so that each of said upper compression members remains in association with one group of openings as the table rotates, the upper ends of the openings of each group lying on a smooth surface and the upper compression member associated with each said group of openings having a similarly shaped smooth surface of greater area than the area occupied by the group of openings so that said upper compression member can fit tightly against and simultaneously close off tightly the upper ends of the group of openings associated therewith;

a punch driver associated with each group of openings and means mounting said punch drivers for rotation with said table, said punch drivers each having secured thereto a group of punches each of which extends into an opening of the group of openings associated therewith and which forms a movable bottom wall therefor;

and means for moving said upper compression members and said punch drivers forward and away from each other as the table rotates.

6. In a process for forming very small pellets from a powder, employing a rotatable table having a plurality of circumferentially spaced groups of pellet-forming cavities, each cavity having a movable lower wall therewithin, the upper ends of all of the cavities of each group lying on a smooth upper surface, and a movable one-piece upper compression member located at a pellet-forming station and having a smooth lower surface adapted for tightly fitting against said upper surface of each group when same is positioned at said station in order to close off the upper ends of said cavities, the steps comprising:

rotating said table and thereby moving each of said groups of cavities on said table in succession through filling, pellet-forming and ejection stations;

at the filling station, placing powder on the upper surface of said table and moving the powder into the cavities by moving the table beneath scraping elements which slideably contact the upper surface of said table to substantially simultaneously fill all of the cavities of a group with a measured amount of powder;

at the pellet-forming station, tightly pressing the smooth lower surface of said upper compression member downwardly against the upper surface of a group of cavities to close off simultaneously the upper ends of all of the cavities of the group and simultaneously moving the movable lower walls of all of the cavities of the group upwardly toward said upper compression member while urging said upper compression member downwardly against said upper surface whereby pellets are formed in each cavity by compression of the powder therewithin between said lower walls and said upper compression member; and removing said upper compression member and, at said ejection station, moving said movable lower walls farther upwardly to discharge the pellets from the cavities.

7. In a process for forming very small pellets from a powder, employing a rotatable table having a plurality of circumferentially spaced groups of pellet-forming cavities, each cavity having a movable lower wall therewithin, the upper ends of all of the cavities of each group lying on a smooth upper surface, and a movable one-piece upper compression member located at a pellet-forming station and having a smooth lower surface adapted for tightly fitting against said upper surface of each group when same is positioned at said station in order to close off the upper ends of said cavities, the steps comprising:

rotating said table and thereby moving each of said groups of cavities on said table in succession through filling, pellet-forming and ejection stations;

brushing the lower surface of the upper compression member between said filling station and said pellet-forming station to remove powder therefrom;

cleaning the cavities of each group between the pellet-forming station and the filling station to remove powder therefrom;

at the filing station, substantially simultaneously filling all of the cavities of a group with a measured amount of powder;

at the pellet-forming station, tightly pressing the smooth lower surface of said upper compression member downwardly against the upper surface of a group of cavities to close off simultaneously the upper ends of all of the cavities of the group and simultaneously moving the movable lower walls of all of the cavities of the group upwardly toward said upper compression member while urging said upper compression member downwardly against said upper surface whereby pellets are formed in each cavity by compression of the powder therewithin between said lower walls and said upper compression member; and removing said upper compresison member and, at said ejection station, moving said movable lower walls farther upwardly to discharge the pellets from the cavities.

8. In a tableting machine for making small tablets, the combination comprising:

a table having a group of openings therethrough and means for moving said table between a filling station and a compression station, said openings being formed in and extending through the base wall of a generally cup-shaped platen member, said platen member being removably inserted into said table;

a movable upper compression member engageable with the upper surface of said base wall of said platen for simultaneously closing the upper ends of all of said openings of said group;

means for holding said upper compression member away from said table when same is in the region of said filling station and means for urging said upper compression member downwardly and tightly against said table when same is in the region of said compression station;

a single punch driver for said group of openings and means mounting same for movement with said table, said punch driver having a head which is reciprocably disposed within said platen member;

a plurality of punches extending from said head at least partially into said openings from below and means by which movement of said punch driver effects simultaneous movement of said plurality of punches;

lower means for effecting retraction of said punches at said filling station and urging said punches upwardly toward upper compression member in the region of said compression station;

whereby said openings may be filled with powder in said filling station and compressed into pellets of predetermined size and density in said compression station.

9. In a tableting machine for making small tablets, the combination comprising:

a rotatable table having a plurality of circumferentially spaced groups of openings therethrough and means for moving said table between a filling station and a compression station;

a movable upper compression member for each of said groups of openings, said compression member being engageable with the upper surface of said table for simultaneously closing the upper ends of all of said openings of the group with which it is associated;

means for holding said upper compression member away from said table when same is in the region of said filling station;

a plate on the upper end of each of said upper compression members and an upper comression wheel at said compression station arranged to bear on said plates in succession for holding said upper compression members against said table as same successively pass under said wheel to provide a force holding said upper compression members tightly against said table when same is in the region of said compression station, said plates extending a greater distance in a circumferential direction than their associated upper compression members;

a single punch driver associated with each of said groups of openings and means mounting same for movement with said table;

a plurality of punches associated with each punch driver and each of said punches entering into one of said openings from below and means by which movement of each punch driver effects simultaneous movement of the plurality of punches associated therewith;

lower means for effecting retraction of said punches at said filling station and a lower compression wheel at said compression station for engaging said punch drivers in succession to move said punches upwardly in said openings, the axis of said upper compression wheel and the axis of said lower compression wheel being circumferentially offset sufficiently that the force holding said upper compression member against said table is at least substantially fully developed before pressure from said lower compression wheel means develops at all;

whereby said openings may be filled with powder in said filling station and compressed into pellets of predetermined size and density in said compression station.

10. In a tableting machine for making small tablets, the combination comprising:

a table having a group of openings therethrough and means for moving said table between a filling station and a compression station;

a movable upper compression member engageable with the upper surface of said table for simultaneously closing the upper ends of all of said openings of said group;

means for holding said upper compression member away from said table when same is in the region of said filling station and means for urging said upper compression member downwardly and tightly against said table when same is in the region of said compression station;

a single punch driver for said group of openings and means mounting same for movement with said table;

a plurality of punches each entering into one of said table openings from below and means by which movement of said punch driver effects simultaneous movement of said plurality of punches;

lower means for effecting retraction of said punches at said filling station and urging said punches upwardly toward said upper compression member in the region of said compression station;

whereby said openings may be filled with powder in said filling station and compressed into pellets of predetermined size and density in said compression station; and withdrawal means for removing said tablets from said openings, said withdrawal means comprising a block having a downwardly facing channel-shaped cavity, said block substantially touching the upper surface of said table with said cavity straddling said openings and means for applying vacuum to the interior of said block.

11. In a tableting machine for making small tablets, the combination comprising:

a rotatable table having a plurality of circumferentially spaced groups of openings therethrough and means for moving said table between a filling station and a compression station, said rotatable table having a plurality of upwardly directed members defining the guide recesses, support blocks within said guide recesses extending radially outwardly to a point over said table openings;

a movable upper compression member for each of said groups of openings, said upper compression member being engageable with the upper surface of said table for simultaneously closing the upper ends of all of said openings of its associated group of openings, means on said support blocks for supporting said upper compression members rigidly with respect thereto and holding same in operating position over said table openings, means for holding said upper compression members away from said table when same is in the region of said filling station including a guide pin extending downwardly from each of said blocks through said table and cam means mounted below said table for engagement with said guide pins, and means for urging said upper compression member downwardly and tightly against said table when same is in the region of said compression station including a plate on the upper end of each of said upper compression members and an upper compression wheel at said compression station arranged to bear on said plates in succession for holding said upper compression members against said table as same successively pass under said wheel to provide a force holding said upper compression members against movement away from said table, said plates extending a greater distance in a circumferential direction than their associated upper compression members;

a single punch driver associated with each of the groups of openings and means for mounting said punch drivers for movement with said table;

a plurality of punches associated with each punch driver, each of said punches entering into one of said table openings from below and means by which movement of each punch driver effects simultaneous movement of the plurality of punches associated therewith;

lower means for effecting retraction of said punches at said filling station and urging said punches upwardly toward said upper compression member in the region of said compression station;

whereby said openings may be filled with powder in said filling station and compressed into pellets of predetermined size and density in said compression station.

References Cited

UNITED STATES PATENTS

| | | | |
|---|---|---|---|
| 639,919 | 12/1899 | Colton | 107—17 |
| 844,093 | 2/1907 | Brann | 107—17 |
| 901,937 | 10/1908 | Scott | 107—17 |
| 1,289,570 | 12/1918 | Stokes | 107—17 |
| 2,969,753 | 1/1961 | Abbe et al. | 107—17 X |
| 3,175,521 | 3/1965 | Hershberg | 107—17 |

FOREIGN PATENTS 26,190    1910    Great Britain.

WALTER A. SCHEEL, *Primary Examiner.*

IRVING BUNEVICH, J. SHEA, *Assistant Examiners.*